(12) United States Patent
Altemark

(10) Patent No.: US 7,830,030 B2
(45) Date of Patent: Nov. 9, 2010

(54) METHOD FOR OPERATING A WIND ENERGY SYSTEM

(75) Inventor: Jens Altemark, Rendsburg (DE)

(73) Assignee: REpower Systems AG, Hamburg (DE)

( * ) Notice: Subject to any disclaimer, the term of this patent is extended or adjusted under 35 U.S.C. 154(b) by 221 days.

(21) Appl. No.: 12/077,971

(22) Filed: Mar. 24, 2008

(65) Prior Publication Data
US 2008/0238100 A1  Oct. 2, 2008

(30) Foreign Application Priority Data
Mar. 26, 2007  (DE) .................. 10 2007 014 863

(51) Int. Cl.
*F03D 9/00* (2006.01)
(52) U.S. Cl. .................. 290/44; 290/42; 290/43; 290/28; 290/55; 322/28; 322/29
(58) Field of Classification Search .................. 290/44, 290/42, 43, 55, 28; 322/28, 29
See application file for complete search history.

(56) References Cited

U.S. PATENT DOCUMENTS 7,605,487 B2 * 10/2009 Barton et al. .................. 290/44
7,622,816 B2 * 11/2009 Stahlkopf .................. 290/44

FOREIGN PATENT DOCUMENTS

| DE | 101 27 451 A1 | 12/2002 |
|---|---|---|
| DE | 101 13 038 C2 | 4/2003 |
| DE | 103 23 785 A1 | 12/2004 |
| DE | 195 32 409 B4 | 5/2005 |
| DE | 10 2004 056 255 B4 | 2/2007 |

OTHER PUBLICATIONS

German Examination Report in corresponding German priority application DE 10 2007 014 863.3, mailed Oct. 7, 2008 (3 pages).
English translation of German Examination Report in corresponding German priority application DE 10 2007 014 863.3, mailed Oct. 7, 2008 (5 pages).

* cited by examiner

*Primary Examiner*—T C Patel
*Assistant Examiner*—Iraj A Mohandesi
(74) *Attorney, Agent, or Firm*—Nash and Titus, LLC

(57) ABSTRACT

The invention relates to a method for operating a wind energy system wherein when a first settable boundary value ($G_1$) is reached by a first parameter ($M_1$) a process is automatically started whose course is monitored by measuring a second parameter ($M_2$). By comparing the measured values of the second parameter ($M_2$) with a second settable boundary value ($G_2$), the first settable boundary value is changed upon reaching the second boundary value ($G_2$) by the second parameter ($M_2$).

16 Claims, 1 Drawing Sheet

METHOD FOR OPERATING A WIND ENERGY SYSTEM

This application claims priority from German patent application DE 10 2007 014 863.3, filed Mar. 26, 2007, and the entire contents of the German application are incorporated herein by reference.

The invention relates to a method for operating a wind energy system as well as to a wind energy system for carrying out such a method.

BACKGROUND OF THE INVENTION

Methods for operating wind energy systems are sufficiently known in the state of the art. DE 101 27 451 A1 teaches a method for controlling a wind energy system in that an operating setting such as, e.g., the angular position of a rotor blade is periodically varied within certain boundary values and during this time the power output of the wind energy system is checked. The power output here is compared during the variation with the power output of the original operating setting and the operating setting is changed if necessary in order to optimize the power output.

A disadvantage of the above-described method is, among other things, the fact that a periodic reduction of the power output can be determined by the periodic variation since the wind energy system leaves its optimal position over and over again. In particular, this method is only suitable for an optimization at a stable operating point and not suitable for optimizing dynamic courses of the wind energy system in which a variation of the operating parameters during the course of a process is not possible.

SUMMARY OF THE INVENTION

The invention addresses the need for making available a method for operating a wind energy system in accordance with the state of the art and a wind energy system for carrying out such a method that avoids the disadvantages cited above.

The problem is solved in its first aspect by an initially cited method in that when a first settable boundary value is reached by a first parameter a process is automatically started whose course is monitored by measuring a second parameter and by comparing the measured values of the second parameter with the second settable boundary value and that the first settable boundary value is changed upon reaching the second boundary value by the second parameter.

DETAILED DESCRIPTION OF THE PREFERRED EMBODIMENTS

Figure 1:
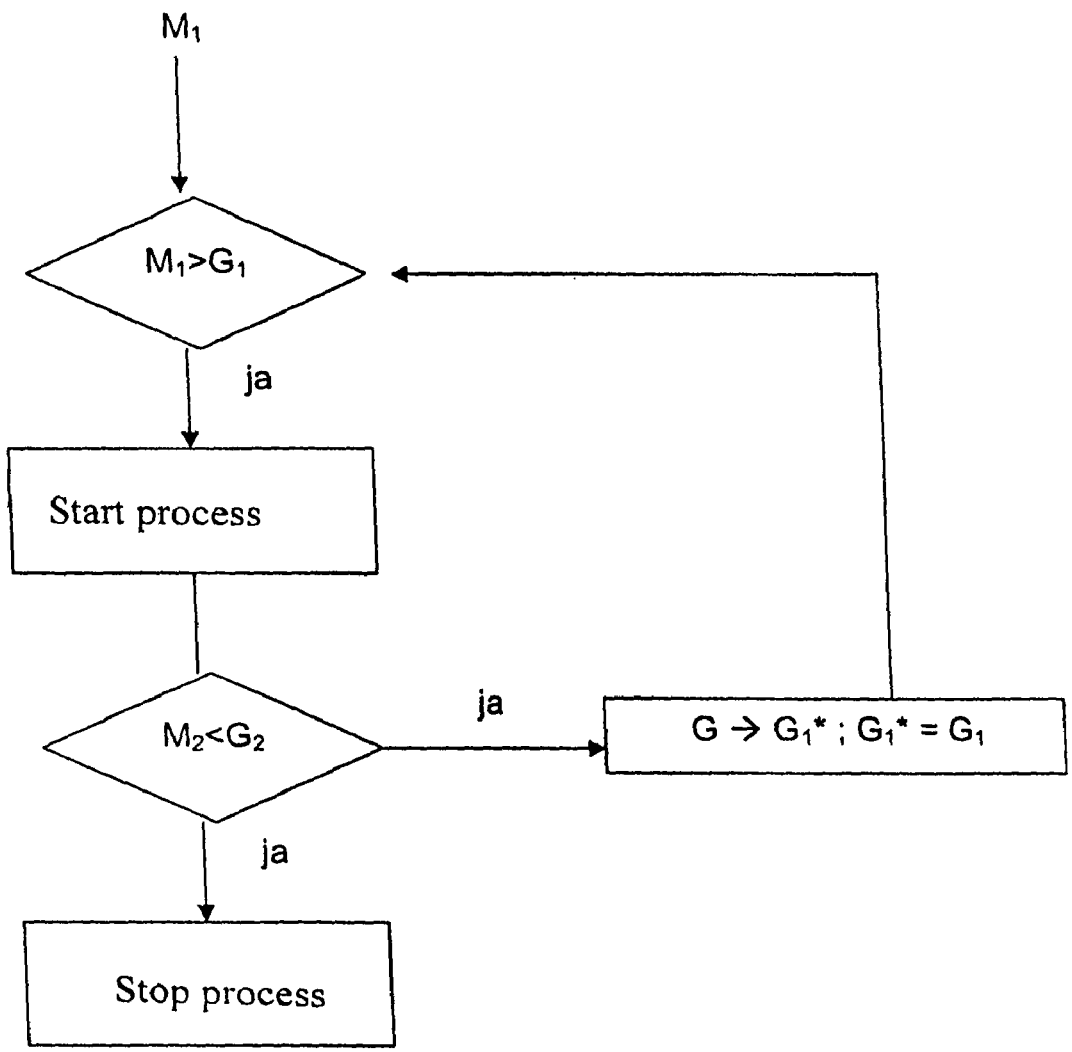
FIG. 1 shows a flow chart of a method in accordance with the invention.

Different processes are carried out in order to operate a wind energy system. This means processes such as, e.g., starting and slowing down the wind energy system and turning the machine housing in the direction of the wind. The processes are started and/or stopped when boundary values of measured parameters are reached. For example, the wind energy system is started as soon as a wind speed boundary value or a boundary value of a rotor speed in neutral is exceeded by measured values of a parameter.

Because the measured parameter values are subject by nature to fluctuations, disadvantageous process courses can occur. The wind strength is constantly subject to fluctuations. Thus, the wind energy system can be started too early, e.g., on account of wind gusts or the machine housing can be moved because an isolated gust of wind reaches boundary values even though such a process subsequently does not bring about a sufficient or increased power output.

It turned out that a method for operating a wind energy system can be improved in that boundary values of parameters are changed by learning. In this manner the probability of an optimized process course is increased.

To this end boundary values are changed in accordance with the invention in that information about a process that previously took place, was initiated by reaching the boundary value but as a result was not optimized is stored by changing the height of its value.

A further advantage of the invention is constituted by the calibration of the measuring apparatus for detecting the first parameter. Measuring apparatuses are designed as regards their precision for their maximal measuring range. However, to the extent that the measuring apparatuses are operated in their lower measuring range, the error in relationship to the measured parameter is very large. The second parameter is customarily measured with a measuring apparatus designed for the measuring range. Therefore, a systematic erroneous measuring in the lower measuring range is corrected by the previously cited method—the measuring apparatus of the first measuring magnitude is so to say "calibrated" with the second measuring apparatus in the lower range.

In a further development of the method in accordance with the invention the process is automatically started by the first or at least by another first parameter when the first or another first settable boundary value is reached. The process is monitored by the second parameter. When the second boundary value is reached by the second parameter only the first settable boundary value is changed that led to the initiation of the process. It is also conceivable to monitor the process by the second and at least another second parameter with which the second and/or another second settable boundary value is/are associated. When one of the second boundary values is reached, then only the first settable boundary value is also changed that led to the initiation of the process.

The process is preferably a start/stop procedure, in particular the starting and slowing down of the wind energy system. The wind energy system is accelerated when a first boundary value is exceeded. The first boundary value can be a wind speed boundary value and the first parameter can be a wind speed. An instantaneous wind speed or a wind speed averaged over a short time period can be selected as wind speed. When the first settable boundary value is exceeded by the measured wind speed the wind energy system is started. After the system has been started its regulating operation is monitored by measuring the second parameter, that is, e.g., the electrical output power of the wind energy system. If the electrical output power of the wind energy system drops below the associated second boundary value during the regulating operation the wind energy system can be turned off. An economical operation of the wind energy system can no longer be ensured for the instance that the electrical output power is below or drops below the settable power boundary value. According to the invention the wind energy system is then slowed down and, in addition, the first boundary value is changed. The wind speed boundary value is raised. As a result, in this special instance the general condition is ensured that the first settable boundary value is changed in such a manner that the reaching of the second settable boundary value becomes more unlikely when the process is repeated.

The method brings it about that the boundary value of the wind speed of every wind energy system is adapted to the individual circumstances of the wind energy system. Thus, an unusually large gradient in the wind speed can be taken into account by the method via the rotor diameter in the starting behavior, or, an inaccuracy of the anemometer is corrected at low wind speeds via this process. In this case the rotor is, so to say, the "giant anemometer" that calibrates the anemometer via the method of the invention.

In one embodiment of the invention the speed of the rotor in neutral is selected as the first parameter. In neutral or standstill of the wind energy system the rotor does turn but no current is being produced. The starting procedures initiated when a speed boundary value is exceeded. Once again, the output power or the indicated current can be measured as second parameter and when a power boundary value or current boundary value is dropped below, the wind energy system is slowed down and the speed boundary value is changed upward.

In a further embodiment of the invention the process can be an adjusting procedure of the following of the wind direction. In this instance an angle of the instantaneous wind direction is selected as the first parameter for aligning the wind energy system. When the settable boundary angle is exceeded the rotor tracks with the machine housing. This tracking is problematic in gusty wind with rapidly changing wind directions. In order to prevent a constant tracking of the wind energy system a second parameter is also measured here, preferably continuously. This can also be the power output of the wind energy system but also the current generated by the wind energy system. If the rotor was tracked due to a gusty change in the wind direction the power output values fall below a given power output boundary value because the main wind direction did not make a corresponding change. In order to avoid such non-purposeful trackings in the future the wind direction angle is increased.

Standard boundary values of the first and second settable boundary value are preferably entered into the system control that are optimally adapted to the geographic, seasonal, and similar conditions at the erection site of the wind energy system viewed over the entire year. The changed first and/or second boundary value(s) is (are) advantageously set back to the particular standard boundary value after a settable regulating operation time.

In another preferred embodiment of the invention a precipitous changing of the boundary values is counteracted in that the first boundary value is changed, if necessary, when a minimal operating time has been dropped below, in which case the minimal operating time is defined as between the starting time of the process and the time of the first following reaching of the second boundary value. If the wind energy system was started and went over to standard operation and the boundary value of the power output is dropped below, e.g., only after a period of approximately several hours, it is not necessary to change the boundary value of the wind speed.

In another preferred embodiment of the invention the first settable boundary value is changed in such a manner that to the extent that the second boundary value is not reached by the second parameter when carrying out the process, the reaching of the second settable boundary value becomes more probable when executing the process. If the second boundary value, that is, e.g., the power output of the wind energy system, is not reached in standard operation the boundary value of the wind speed is lowered in order to facilitate a restarting of the wind energy system. This brings it about that the wind energy system tends to reach the second boundary value and the second boundary value is always close to the optimum, that is, is not changed only in one direction.

The problem is solved for the wind energy system by an initially-cited wind energy system with a first measuring apparatus for a first parameter and a second measuring apparatus for a second parameter that communicate with a system control in which a first boundary value of the first parameter and a second boundary value of the second parameter are filed, and which, when the first boundary value is reached by the first parameter, automatically starts a process whose course is monitored by comparing the measured values of the second parameter with the second settable boundary value and changes the first settable boundary value when the second boundary value is reached by the second parameter.

A first boundary value is filed in the system control that is the necessary condition for the beginning of the process. The values of the associated first parameter are preferably continuously determined by the measuring apparatus and when the first boundary value is reached the process, e.g., the starting of the wind energy system or the tracking of the machine housing, is started. The process is monitored by a second parameter measured by the second measuring apparatus. The second parameter can be the power output of the wind energy system, the outputted current of the wind energy system or also the wind speed itself.

The wind energy system and advantageously comprises a cut-off automatic controlled by the system control after the second boundary value has been reached. If, e.g., the power output of the wind energy drops below the boundary value of the power output or if the wind speed or the speed drops below a wind speed boundary value or a speed boundary value the system is automatically slowed down because it is no longer operating economically.

In a further preferred embodiment of the invention a time meter is provided that communicates with the system control. In addition, a minimal operating time is filed in the system control that is defined as between the starting time of the process and the time of the first following reaching of the second boundary value. The system control does not change the first boundary value until when the minimal operating time is dropped below. This takes into account the fact that the first boundary value as well as the second boundary value are basically adapted optimally in the middle of the year to the local conditions of the standpoint of the wind energy system and should be changed only temporarily if a too rapid and constant cutting in and out of the wind energy system or tracking of the rotor would too heavily load functional parts of the wind energy system.

The first measuring apparatus can be, e.g., a speed meter, an anemometer, a thermometer, a voltage meter or a frequency meter and the second measuring apparatus can be a speed meter, an anemometer, a current meter of a power meter. However, other measuring apparatuses are also conceivable.

The invention is described in FIG. 1 using an exemplary embodiment.

The method described in an exemplary manner serves to start a wind energy system. The values of a first parameter are continuously measured by a first measuring apparatus. In this exemplary embodiment the wind speed $M_1$ is selected as the first parameter. In order to measure the wind speed $M_1$ an anemometer embodying the first measuring apparatus is fastened on the machine housing of the wind energy system. The anemometer measures the instantaneous wind speed $M_1$. The measured values of the instantaneous wind speed $M_1$ are fed to a system control. A comparison apparatus is provided in the system control that compares a measured value of the wind speed $M_1$ with a first boundary value $G_1$ of the wind speed stored in the system control. The first boundary value $G_1$ is variable and can be stored in different settable magnitudes in the system control.

If the measured instantaneous when speed $M_1$ exceeds the given wind speed boundary value the starting procedure of the wind energy system is started. To this end rotor blades are rotated out of the so-called flag position transversely into the wind and the rotor begins to move under the action of the wind. After a given rotor speed has been reached the generator is synchronized with the electrical network and coupled via a switch.

A second parameter is continuously measured at least during the operation of the wind energy system. The measured values of the second parameter are also fed to the control system, where the values of the second parameter are continuously compared with a second boundary value. In this exemplary embodiment the electrical output power $M_2$ of the wind energy system is selected as the second parameter and the second boundary value is an electrical power value $G_2$.

In this exemplary embodiment the electrical output power is not yet measured during the starting procedure of the wind energy system but rather only after the wind energy system has entered its standard operation. In rather large wind energy systems an averaging in time of the electrical output power takes place to a certain extent because the rotor has a large moment of inertia and extreme peaks and valleys of the speed are evened out therewith. The rotor inertia thus stabilizes the electrical output power.

If the measured values of the electrical output power $M_2$ drop below the electrical power boundary value $G_2$, the wind energy system outputs too little current for being able to operate economically. In this instance the wind energy system is automatically slowed down and turned off. The system control comprises the starting- and slowing-down automatic of the wind energy system for this purpose.

If the time interval between the starting procedure and the slowing-down procedure of the wind energy system drops below a given least time the system control raises the wind speed boundary value $G_1$ by a given amount. The wind speed boundary value is raised here by approximately 15% of the absolute value of the original wind speed boundary value $G_1$.

As a result of the raising of the wind speed boundary value $G_1$ the wind energy system does not cut in the future until at higher wind speeds.

The raising of the wind speed boundary value $G_1$ makes it more unlikely that the wind energy system drops below the power boundary value $G_2$ after starting up because at higher instantaneous wind speeds $M_1$ a higher average wind speed positively correlating with the electrical output power $M_2$ is to be assumed. In this manner a constant cutting in and out of the wind energy system is effectively counteracted. Sensitive structural components such as, e.g., the power switch of the generator, that is designed for a limited number of switching procedures, are less stressed as a result.

An average wind speed boundary value on the machine housing is advantageously calculated from the measured instantaneous wind speed $M_1$ on the machine housing of the wind energy system. An averaging of the wind speed over a given time period levels out the measured values supplied to the control system in advance and reduces the danger of an unauthorized starting of the system in addition.

It can also be advantageously provided that the boundary values $G_1$, $G_2$ are set back to their originally filed value if the system had been in operation throughout a settable operating time after being turned on because they correspond the best to the geographical and climatic conditions on the average over time.

LIST OF REFERENCE NUMERALS $G_1$ wind speed boundary value
$G_2$ output power boundary value
$M_1$ wind speed
$M_2$ output power

The invention claimed is:

1. A method for operating a wind energy system comprising the steps of
   (i) setting a first boundary value that is reachable by a first parameter, wherein when the first boundary value is reached by the first parameter a process for operating the wind energy system is automatically initiated;
   (ii) allowing the first parameter to be reached, so as to automatically start the process for operating the wind energy system;
   (iii) monitoring the operation of the wind energy system by measuring a second parameter, and comparing measured values of the second parameter with a second settable boundary value, wherein when the second boundary value is reached by the second parameter, the first boundary value is changed and the process for operating the wind energy system is automatically changed accordingly;
   wherein there is a defined minimum operating time between when the process for operating the wind energy system is automatically initiated in step (i) and when the second boundary value is reached the first time in step (iii); and wherein the first boundary value in step (i) is changed only if the operating time between when the process for operating the wind energy system is automatically initiated in step (i) and when the second boundary value is reached the first time in step (iii) drops below the defined minimum operating time.

2. The method according to claim 1, wherein the process is stopped or reversed when the second boundary value is reached.

3. The method according to claim 1, wherein step (i) comprises setting a first boundary value or at least one more first boundary value that is reachable by a first parameter or at least another first parameter, and wherein step (ii) comprise allowing the first parameter or at least one more first parameter to be reached, and wherein step (iii) comprises monitoring the operation of the wind energy system by measuring a second parameter, and comparing measured values of the second parameter with a second settable boundary value, wherein when the second boundary value is reached by the second parameter, only the boundary value reached before the process of operating is initiated is changed accordingly.

4. The method according to claim 1, wherein the first boundary value is changed such that the second boundary value becomes less likely to reach during the process of operating the wind energy system.

5. The method according to claim 1, wherein to the extent that the second boundary value is not reached when carrying out the process, the first boundary value is changed in such a manner that the reaching of the second boundary value becomes more likely when executing the process.

6. The method according to claim 1, wherein the first boundary value is changed by at the most 20% of its absolute value.

7. The method according to claim 1, wherein the first boundary value is changed within a settable range.

8. The method according to claim 1, wherein the first and/or second parameter(s) is/are continuously measured.

9. The method according to claim 1, wherein the first parameter is selected from the group consisting of rotor speed, wind speed, temperature, electrical voltage, or frequency of an electrical alternating voltage, and the first boundary value is selected from the group consisting of, respectively associated in with the first parameter, a rotor speed boundary value, a wind speed boundary value, a temperature boundary value, a voltage boundary value, and a frequency boundary value.

10. The method according to claim 1, wherein the process for operating the wind energy system is selected from the group consisting of a starting procedure, a slowing-down procedure, a procedure for adjusting a rotor blade, a procedure for tracking wind direction, and a procedure for adjusting torque on a generator.

11. The method according to claim 1, wherein the second parameter is selected from the group consisting of electrical output power of the wind energy system (WEA), current generated by the WEA, wind speed, and rotor speed, and the second boundary value is selected from the group consisting of, respectively associated in with the second parameter, a power boundary value, a current boundary value, a wind speed boundary value, and a rotor speed boundary value.

12. The method according to claim 1, wherein the second boundary value is adjustable after a settable operating time to a normal boundary value.

13. A wind energy system comprising
a first measuring apparatus for a first parameter;
a second measuring apparatus for a second parameter, which first and second measuring apparatus communicate with a system control,
wherein the system control is programmable to set a first boundary value that is reachable by a first parameter, wherein when the first boundary value is reached by the first parameter as measured by the first measuring apparatus a process for operating the wind energy system is automatically initiated, and wherein the system control is programmable to set a second boundary value and monitor the operation of the wind energy system and compare measured values of the second parameter with a second settable boundary value, wherein when the second boundary value is reached by the second parameter as measured by the second measuring apparatus the first boundary value is changed and the process for operating the wind energy system is automatically changed accordingly,
a time meter that communicates with the system control, wherein the time meter is programmable for a given minimum operating time between when the process of operating the wind energy system is initiated and when the second boundary value is reached, wherein the first boundary value is changed only when the operating time between when the process for operating the wind energy system is initiated and when the second boundary value is reached drops below the minimum operating time.

14. The wind energy system according to claim 13, which further comprises an automatic cut-off, wherein the system control regulates the automatic cut-off automatic upon reaching the second boundary value.

15. The wind energy system according to claims 13, wherein the first measuring apparatus is selected from the group consisting of a speed meter, anemometer, thermometer, voltage meter, current meter, power meter and frequency meter.

16. The wind energy system according to claim 13, wherein the second measuring apparatus is selected from the group consisting of a speed meter, anemometer, current meter and power meter.

* * * * *